United States Patent
Heine et al.

[11] 3,842,332
[45] Oct. 15, 1974

[54] FIVE-PHASE STEPPING MOTOR SYSTEMS

[75] Inventors: Günter Heine; Carsten Dröge; Bruno Borgonovi, all of Lahr, Germany

[73] Assignee: Gerhard Berger Fabrik Elektrischer Messgerate, Lahr, Germany

[22] Filed: Oct. 4, 1972

[21] Appl. No.: 294,787

[52] U.S. Cl. .............................. 318/696, 318/138
[51] Int. Cl. ................................................ G05b 19/40
[58] Field of Search ........... 318/696, 685, 138, 254; 310/49

[56] References Cited
UNITED STATES PATENTS

| | | | |
|---|---|---|---|
| 3,197,685 | 7/1965 | Hetzel | 318/696 |
| 3,229,179 | 1/1966 | Hetzel | 318/138 |
| 3,286,147 | 11/1966 | Parker et al. | 318/138 |
| 3,364,407 | 1/1968 | Hill | 318/138 |
| 3,386,019 | 5/1968 | Hill | 318/138 |
| 3,531,702 | 9/1970 | Hill | 318/138 |
| 3,609,500 | 9/1971 | Lauser | 318/696 |
| 3,614,580 | 10/1971 | Eto | 318/696 |
| 3,621,358 | 11/1971 | Hinrichs | 318/696 |
| 3,720,865 | 3/1973 | Bregeault | 318/696 |

Primary Examiner—G. R. Simmons
Attorney, Agent, or Firm—Toren, McGeady & Stanger

[57] ABSTRACT

In the system disclosed, five stator windings of a stepping motor are connected in series with each other to form a loop having five connecting points. Control means switch five transfer switches, each having an armature connected to a connecting point, between a positive and negative potential so as simultaneously to energize four windings and short-circuit the fifth. The control means then shifts the short-circuited condition to other windings in cyclical sequence while energizing the remaining four windings at any time.

17 Claims, 27 Drawing Figures

PUSH-PULL CIRCUIT

BRIDGE CIRCUIT $\phi_1 = \alpha_1 = \frac{1}{5}\tau_P$ $\phi_2 = \alpha_2 = \frac{2}{5}\tau_P$

FIRST STEP POSITION 3,842,332
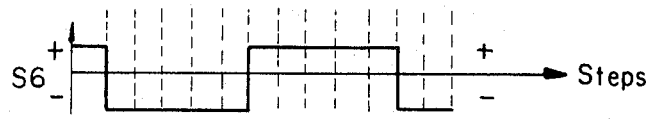
FIG. 4a
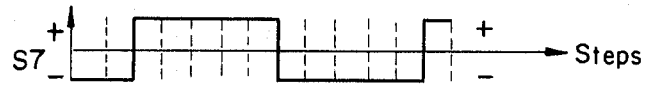
FIG. 4b
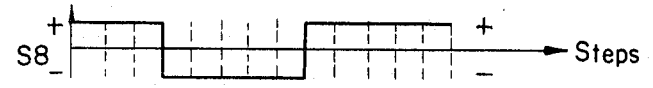
FIG. 4c
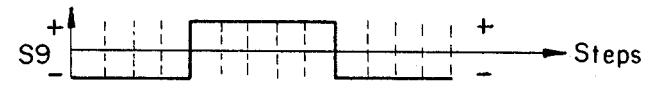
FIG. 4d
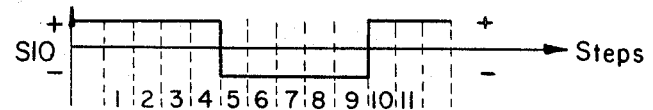
FIG. 4e
$\phi = \frac{1}{5} T_P$
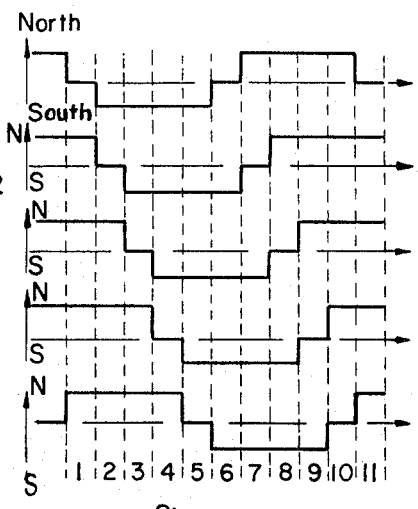
FIG. 5a STATOR 1
FIG. 5b STATOR 2
FIG. 5c STATOR 3
FIG. 5d STATOR 4
FIG. 5e STATOR 5
$\phi = \frac{2}{5} T_P$
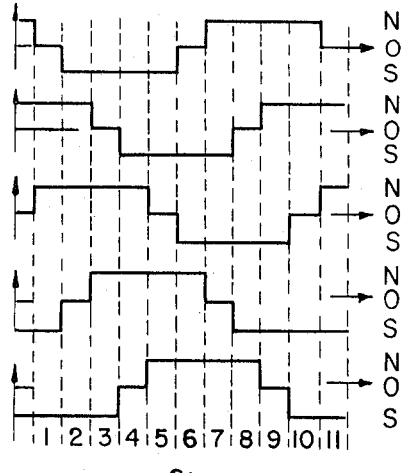
FIG. 5f STATOR 1
FIG. 5g STATOR 2
FIG. 5h STATOR 3
FIG. 5i STATOR 4
FIG. 5j STATOR 5

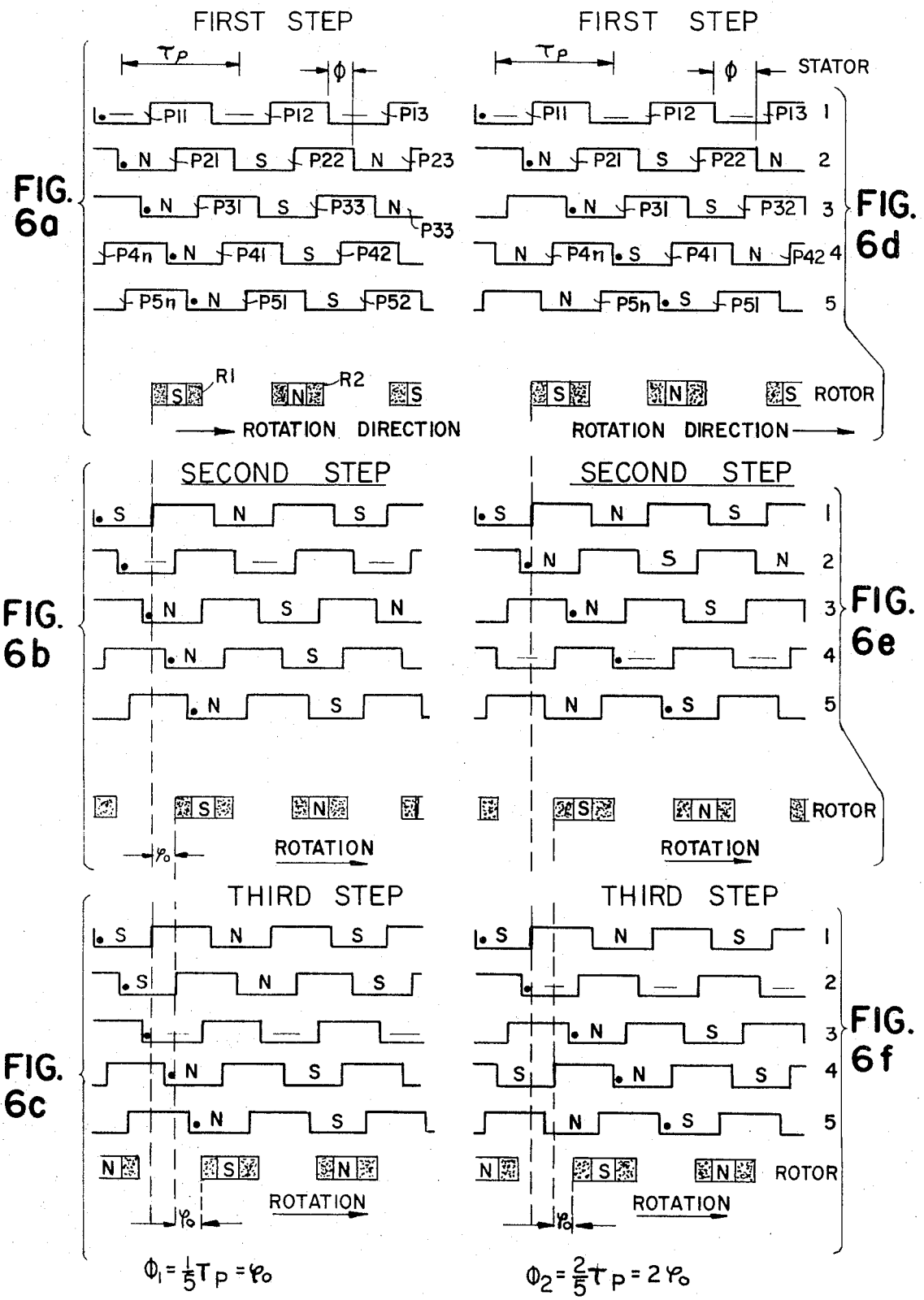

HOLDING MOMENTS WITH 4 &5 EXCITED STATORS $$\Sigma M(11) = \vec{M} \cdot \frac{1}{\sin(90°-\alpha)} \approx 3{,}24 \cdot \vec{M}$$

$$\Sigma M(12) = \vec{M} \cdot \sin\alpha \cdot \frac{1}{\sin(90°-\alpha)} \approx 3{,}1 \vec{M}$$

$$M = \vec{M_1} = \vec{M_2} = \vec{M_3} = \vec{M_4} = \vec{M_5}$$

UP/DOWN SWITCHED TAIL RING COUNTER

Forward    $S_1$ = Low    $S_2$ = High
Backward    S = High    S = Low 3,842,332

FIVE-PHASE STEPPING MOTOR SYSTEMS

BACKGROUND OF THE INVENTION

Each stator north pole of a five-stator stepping motor with a permanent magnet rotor must be converted to a south pole after a predetermined cycle such as five travel steps. Similarly, after five steps each south pole must become a north pole. Accordingly, the current direction in the respective stator windings must be reversed after five steps.

One method of reversing current in each winding is to use a so-called push-pull circuit. Another method is to use an H circuit or bridge circuit.

When the windings are energized by a push-pull circuit, each field winding is divided into two halves, and the circuit energizes only one half of the winding at any time. As is the case with all push-pull circuits, this results in poor thermal utilization of the winding space. Therefore, for any specific copper load a push-pull circuit furnishes only about half the output obtainable from a full wave circuit having the same copper load. Moreover, it is much more difficult to produce a push-pull motor winding than an ordinary motor winding. The advantage of the push-pull circuit resides chiefly in the fact that only five switches are needed to control the windings in a five-phase stepping motor.

When using an H circuit (that is, a full wave or bridge circuit) each stator winding requires but a single coil. Use of the H circuit results in maximum thermal utilization of the winding space and permits use of windings that are easy to produce. However, this circuit has a disadvantage. Ten reversing switches are needed in the electronic control systems for such motors. Since electronic control systems for stepping motors are relatively costly compared to the motors themselves, the use of an H circuit or bridge circuit cannot be economically justified even with high motor utilization.

An object of the present invention is to imprive control circuits for five-phase stepping motors.

Another object of the invention is to improve five-phase stepping motor systems.

Another object of the invention is to furnish five-stator stepping motors with permanent magnet rotors that are capable of providing approximately double the motor output of a push-pull circuit without increasing the number of switches.

SUMMARY OF THE INVENTION

According to a feature of the invention, these objects are obtained in whole or in part, by connecting the five-stator windings in series with each other to form a loop having five connecting nodes. Five transfer switches each having an armature connected to a node are switchable between positive and negative potentials, and control means operate the switches in sequential steps that simultaneously energize four windings and short-circuit the fifth during each step while changing the winding that is short-circuited from step to step.

These and other features of the invention, both broader and more specific, are pointed out in the claims. Other objects and advantages of the invention will become evident from the following detailed description when read in light of the accompanying drawings.

BRIEF DESCRIPTION OF THE DRAWINGS

In the drawings:

FIGS. 4a through 4e are voltage-step diagrams illustrating the switch-actuating sequence, and hence the voltages at the corresponding nodes, at the varying switches in FIGS. 3 and 3a according to an embodiment of the invention.

FIGS. 5a through 5e illustrate the magnetic polarizations of the windings in the system of FIG. 3a when the switches are shifted step-by-step as shown in FIG. 4.

FIGS. 5f through 5j illustrate the magnetic polarities of the five-stator windings in FIG. 3b when the switches are operated as shown in FIG. 4 to produce the corresponding node voltages.

FIGS. 6a through 6c are schematic diagrams illustrating the relationships of the magnetization of the stators and rotors in FIG. 3a when energized according to the diagram of FIGS. 4a through 4e.

FIGS. 6d through 6f are schematic diagrams illustrating the relationships of the magnetizations of the rotor and stator pole of the system in FIG. 3b when energized as illustrated in FIG. 4.

DESCRIPTION OF PREFERRED EMBODIMENTS

Figure 1:
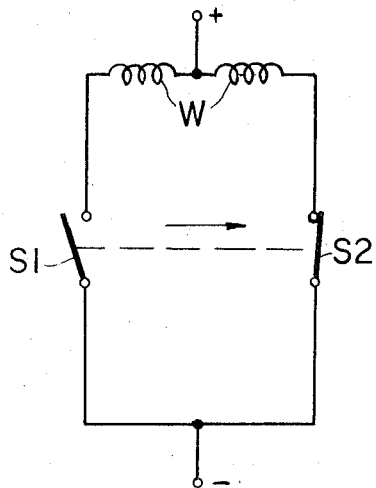
FIG. 1 is a schematic representation of a push-pull circuit connected to a winding according to the prior art.

In FIG. 1 a pair of ganged switches S1 and S2 are connected to a winding W which is center tap. The switches S1 and S2 form a push-pul circuit which alternately applies current through one winding half and then the other. The aforementioned disadvantage concerning a push-pull circuit is evident from this diagram. Current flows only through one half of the winding at any one time. (FIGS. 1 and 2 show prior art.)

Figure 2:
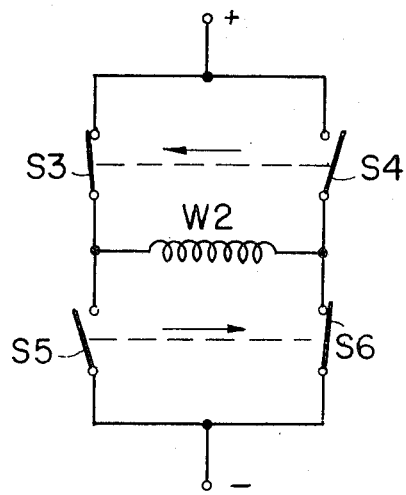
FIG. 2 is a schematic representation of a bridge or H circuit energizing a winding according to the prior art.

In FIG. 2 a winding W2 receives the output from a bridge switching circuit, sometimes called an H circuit, composed of ganged pairs of alternately closed switches S3, S4 and S5, S6. The switches S3, S4 and S5, S6 are ganged to each other so that the switches S3 and S6 are closed together while the switches S4 and S5 are closed together. The winding W2 has its copper fully utilized. However, twice the number of switches are necessary in the circuit of FIG. 2 as in the circuit of FIG. 1. The circuit of FIG. 1 may be simplified so the switches S1 and S2 are replaced by a single transfer or switchover (SPDT) switch. Similarly, the switches S3 through S6 can be replaced by two transfer switches. Nevertheless, the number of switches in FIG. 2 is twice the number as in FIG. 1.

Thus, both of these prior art switching arrangement for stepping motors have disadvantages.

Figure 3A:
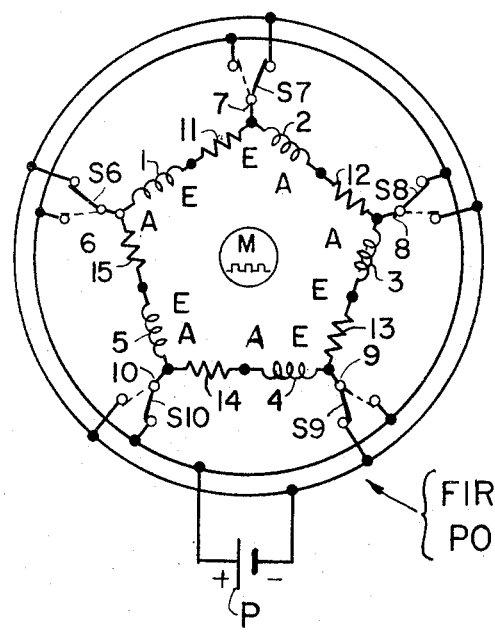
FIG. 3a is a schematic representation of a five-phase stepping motor system embodying features of the invention.

In the embodiment of the invention illustrated in FIG. 3a, five stator windings 1, 2, 3, 4, and 5 are connected in a series looped to form a pentagon similar to the manner in which three windings of a three-phase motor are connected to form a delta connection. The pentagon connection produces five nodes 6, 7, 8, 9, and 10 at the five interconnecting points. Five transfer switches S6, S7, S8, S9, and S10 have respective armatures connected to the nodes 6, 7, 8, 9, and 10 and serve to connect each of the nodes selectively either to the positive or negative terminal of a power source P. During the first step of the stepping motor operation, the switches assume the positions shown. The characters A and E denote the winding directions of the windings 1, 2, 3, 4, and 5. Thus, in the positions shown during the first step, the winding 1 is short-circuited and the windings 2, 3, 4, and 5 simultaneously produce magnetizations of the same magnetic polarity, such as north.

Figure 3B:
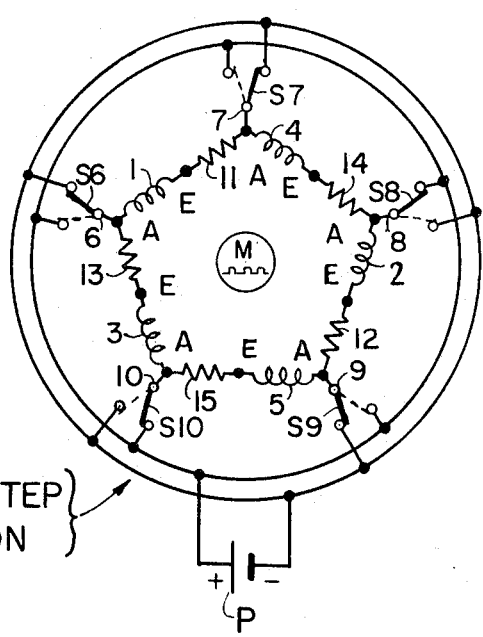
FIG. 3b is a schematic representation of a stepping motor system also embodying features of the invention.

FIG. 3b corresponds to FIG. 3a. Here, the switches S6, S7, S8, S9, and S10 are also shown in the position corresponding to the first step of the stepping motor. These positions are identical to the positions in FIG. 3a. However, in the embodiment of FIG. 3b the windings 1, 2, 3, 4, and 5 are arranged in the winding order 1, 4, 2, 5, and 3. The characters A and E identify the winding directions, as stated.

The switches S6, S7, S8, S9 and S10 form part of a control circuit which switches the switches back and forth between positive and negative poles through a predetermined cycle. Each stator and rotor is divided into individual poles with the stators having an interpolar distance $T_p$ between individual adjacent poles. In order to obtain predetermined uniform rotary stepping angles, the rotary displacement between the adjacent stators or rotors within the pole distance $T_p$ can be $\Phi_1 = 1/5T_p$, or $\Phi_2 = 2/5T_p$.

FIG. 3a illustrates the wiring for producing an angle of rotation $\Phi_1$ and FIG. 3b illustrates the winding required for producing the angle of rotation $\Phi_2$.

FIGS. 4a through 4e illustrate the switch positions of the switches S6, S7, S8, S9, and S10 during a series of steps. It also implicitly represents the voltages appearing at the nodes 6 through 10.

Each of FIGS. 5a through 5e illustrates the polarity of magnetization of one pole in each of the stators energized by the windings 1 through 5 during the first 11 steps in the system of FIG. 3a. Each of FIGS. 5f through 5j illustrates the polarity of magnetization of one pole in each of the stators energized by the windings 1 to 5 during the first 11 steps in the system of FIG. 3b.

FIG. 6a illustrates the position of the stator poles P11, P12,...P1n; P21, P22,...P2n; P31, P32,...P3n; P41, P42, ...P4n; and P51, P52,...P5n of the respective stators 1, 2, 3, 4, and 5 relative to each other and relative to the rotor poles R1, R2, .. during the first step in the system of FIG. 3a when energized as shown in FIG. 4 and operating as shown in FIG. 5a. It is assumed here that the stators, which are fixed relative to each other, rotate relative to the rotor which is fixed. For simplicity, the stators have been designated with the same reference numerals as the windings which they carry.

FIGS. 6b and 6c illustrate the same relationships between the stator poles and rotor poles as FIG. 6a, but for the second and third steps. FIGS. 6d through 6f illustrate the same relationships for the system in FIG. 3b when energized as in FIG. 4 and operating as shown in FIG. 5b.

As can be seen from FIGS. 3a, 3b, 5a, and 5b, four windings carry current during each step. That is to say, four stators are energized simultaneously. The fifth winding is short-circuited either to the negative or positive terminal of the voltage source.

Figure 7:
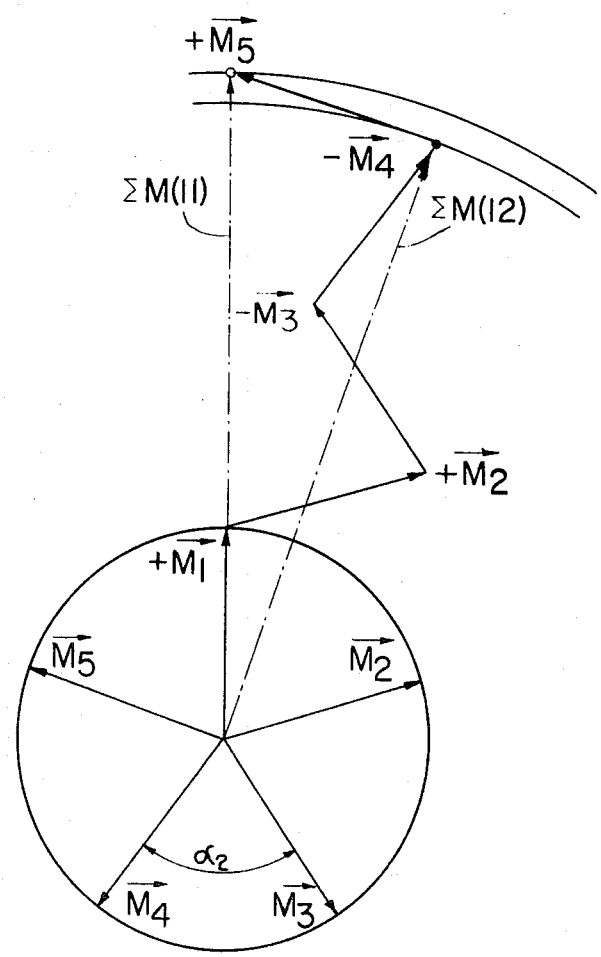
FIG. 7 is a diagram illustrating the holding moment or torque characteristics of the stators according to an embodiment of the invention.

Energizing only four out of five windings may appear to produce some disadvantages. However, it ultimately results in higher efficiency. If it is assumed that the static torque characteristics of the individual stators follow a sinusoidal course, excitation of all five stators, as shown in FIG. 7, produces a characteristic holding moment $\Sigma M(11)$ which is 3.2 times the value of the maximum moment of a single stator. However, when four stators are simultaneously excited, the characteristic holding moment $\Sigma M(12)$ is 3.1 times the value of the maximum moment of a single stator. Thus, energizing four windings instead of five produces a reduction in the holding moment which degrades the dynamic performance by only about 5 percent. The stepping angle and the waviness of the operating torque exhibit substantially the same value when four stators are energized as when five stators are energized. See FIG. 7.

However, energizing only four of five stator windings at any one time reduces the required input power approximately 20 percent. As a result, the total efficiency increases 15 percent with about 20 percent less heating of the motor. Making power comparisons, the motor heating within an insulation class represents a reference point. Thus, the power and hence the maximum moment of a singl stator can be raised about 20 percent when only four stators are excited. As a result, circuits embodying the present invention exhibit an approximately 15 percent higher holding moment than circuits energizing all five windings simultaneously.

The fifth, non-excited, winding is always short-circuited. Thus, the electromotive force which the permanent magnet rotor induces into the short-circuited winding during a stepping operation produces a damping effect on the motor system. Therefore, at higher stepping frequencies the operating torque is again somewhat reduced. However, the degree of damping which is relatively low in all electric stepping motors increases. This reduces undesirable pendular vibrations of the rotor.

Figure 8:
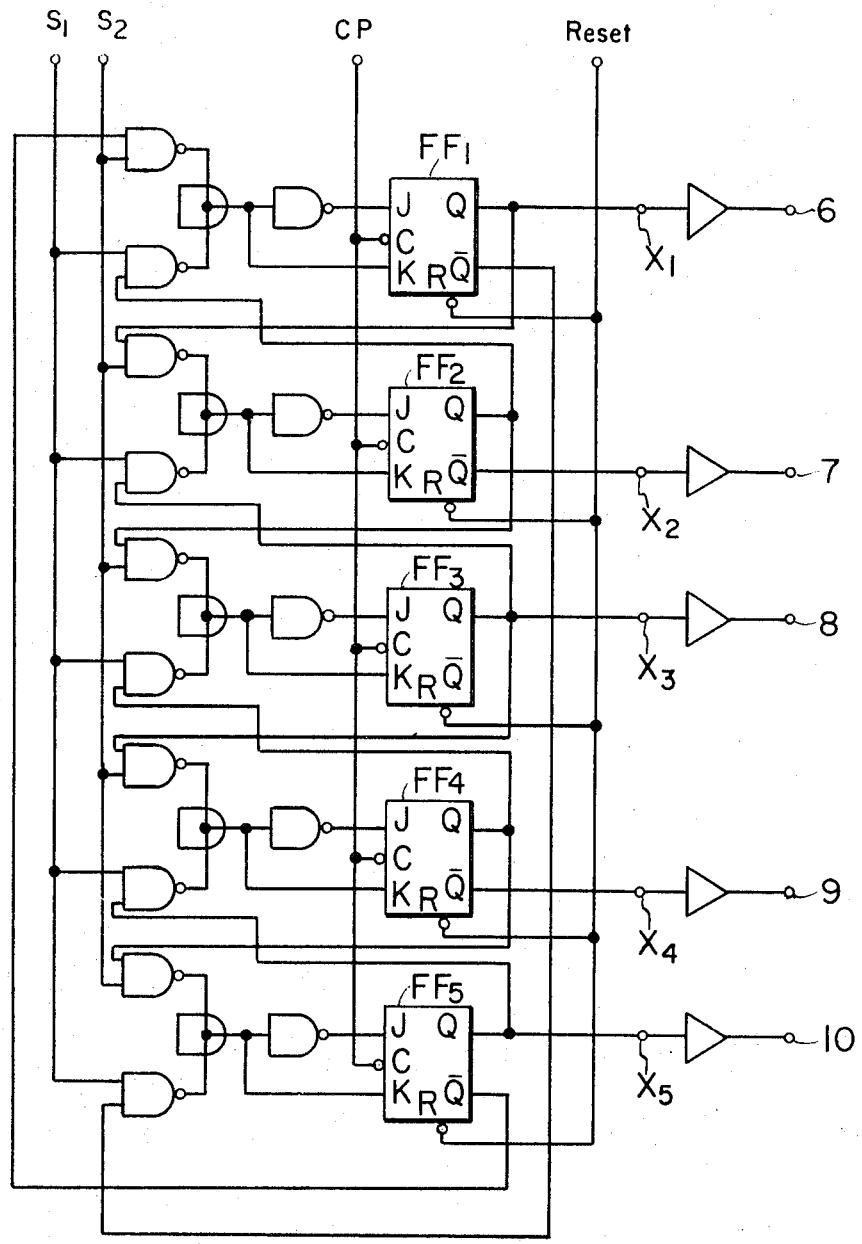
FIG. 8 is a logic diagram illustrating the control circuit that operates or forms the switches in FIGS. 3a and 3b.

FIG. 8 illustrates the logic section of the control circuit. According to an embodiment of the invention, the logic circuit is composed of a shift register with five flip-flops and a crossed return. The back-and-forth control takes place by means of link members with wired- AND circuits. The flip-flop positions not needed for motor movement are suppressed by an additional circuit. It should be noted that, according to the present invention, the circuit arrangement for the five stator stepping motors having magnet rotors improves the performance of the motor over comparable known circuits while maintaining the output power and a stepping angle. The cost of mechanical equipment in electronic circuits is thus greatly reduced.

According to another embodiment of the invention, a resistor is connected between each winding and each of the adjacent nodes. Thus, a resistor would exist between the winding 1 and the node 7. Four more resistors would be distributed between the windings 2, 3, 4, and 5 and the nodes 8, 9, 10, and 16. The resistors 11, 12, 13, 14 and 15 permit rapid excitation of the windings.

According to another embodiment of the invention, five resistors are added in the circuit of FIG. 3a and in the circuit of FIG. 3b. Each resistor is located between a node and the corresponding switch. Thus, one resistor is located between the node 7 and the switch S7. Similarly, a resistance exists between each of the nodes 6, 8, 9, and 10, on the one hand, and the switches S6, S8, S9, and S10 on the other.

These resistors perform the same function as the aforementioned resistors 11, 12, 13, 14 and 15, namely that of permitting rapid excitation of the windings.

What is claimed is:

1. A five-phase stepping motor system, comprising a stepping motor having five untapped stator windings connected in series with each other to form a pentagonal loop having five connecting points, a permanent magnet rotor, and control means connected to said five connecting points for sequentially energizing a different set of four of said windings simultaneously so as to step the motor, said control means forming with said windings damping means for damping the operation of the rotor after each step, said damping means including switching means in said control means for sequentially short circuiting the unenergized one of said windings during each sequential energization of four of the windings.

2. A system as in claim 1, wherein said control means includes five switches each connected to one of said connecting points, positive voltage carrying means, negative voltage carrying means, and a control circuit for connecting said switches between said positive and negative voltage carrying means.

3. A system as in claim 2, wherein said stators include a plurality of poles with a distance $T_p$ between poles, and wherein the poles produce a stepping angle $\Phi = 1/5T_p$.

4. A system as in claim 3, wherein the windings are wound in directions such that current entering or leaving four of the connecting points produces identical magnetic polarities in the stators excited by the windings adjacent to the respective connecting points and current through one of the connecting points produces opposing magnetic polarities in the windings adjacent the one of the connecting points.

5. A system as in claim 2, wherein said windings are wound so that current entering or leaving any one of the connecting points produces opposing magnetic polarities in the windings adjacent the connecting points.

6. A system as in claim 5, wherein said stators each include a plurality of poles, and wherein the rotary displacement between the adjacent stators or rotors is $\Phi = 2/5T_p$, wherein $T_p$ is the pitch between poles.

7. A system as in claim 4, wherein adjacent windings are identified as 1-2-3-4-5-1, and wherein said control means should shift the operation of the windings in the sequence 1-2-3-4-5-1.

8. A system as in claim 6, wherein said windings which are successively adjacent to one another are identified as 1-2-3-4-5-1, and wherein said control means energize said windings so as to shift the energization in the sequence 1—4-2-5-3-1.

9. A system as in claim 1, wherein said stators each includes a plurality of poles forming a pole pitch of $T_p$, and wherein the poles of adjacent stators are displaced relative to each other by a distance equal to one of $1/5T_p$ or $2/5T_p$.

10. A system as in claim 1, wherein said control means short-circuits one of said windings while energizing the others of said windings simultaneously and shifts the short-circuited winding in succession from winding to winding while simultaneously energizing the remaining ones of said windings.

11. A system as in claim 2, wherein said control means energizes said five switches so that two of said switches short-circuit one of said windings while said switches energize the remaining ones of said windings, and wherein said control means changes the switches so as to shift the one of said windings which is short-circuited to the other windings in succession while energizing the remaining ones of said windings.

12. A system as in claim 1, further comprising resistance means for each of said windings, each of said resistance means being connected in series with said one of said windings betwen each winding and the adjacent connecting points.

13. A system as in claim 2, further comprising resistance means connected between each connecting point and the switch connected to said connecting point.

14. A system as in claim 1, wherein said control means includes a logic section composed of a shift register having five flip-flops with a crossed return.

15. A system as in claim 2, wherein said control means further includes a shift register with five flip-flops having a crossed return.

16. A system as in claim 14, wherein said logic section includes a pluraltiy of link members and wired AND gates for producing forward and backward control, and circuit means for suppressing postitions not needed for motor movement.

17. A multi-phase stepping motor system having more than four phases, comprising a stepping motor having a plurality of untapped stator windings equal to the number of phases and connected in series with each other to form a loop having a plurality of connecting points equal to the number of phases, a permanent magnet rotor, and control means connected to said connecting points for sequentially energizing a different set of all but one of said windings simultaneously so as to step the motor, said control means forming with said windings damping means for damping the operation of the rotor after each step, said damping means including switching means in said control means for sequentially short-circuiting the unenergized one of said windings during each sequential energization of the remaining ones of the windings.

* * * * *